INVENTOR.
CHARLES S. OCHS
BY
ATTORNEY

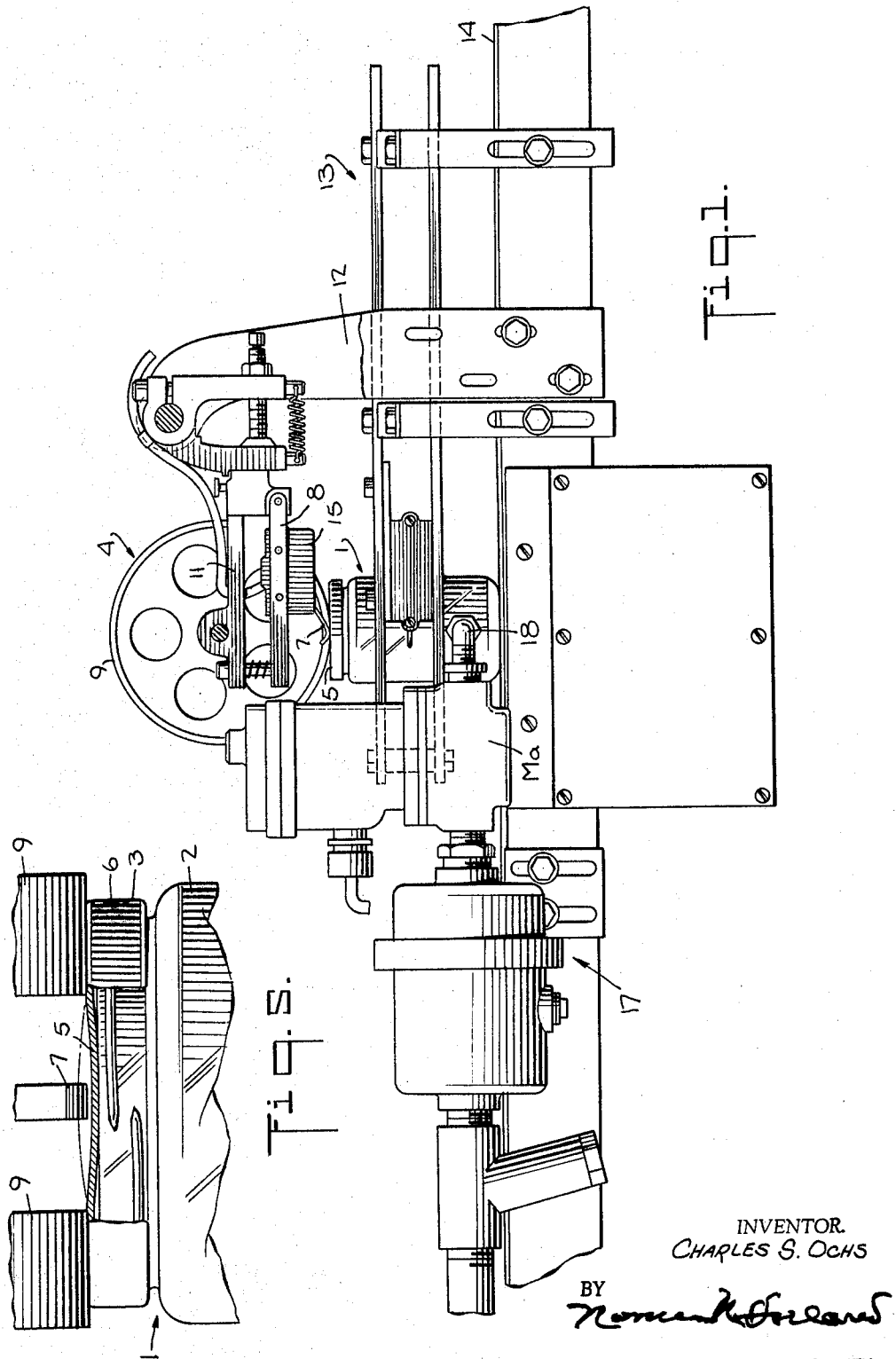

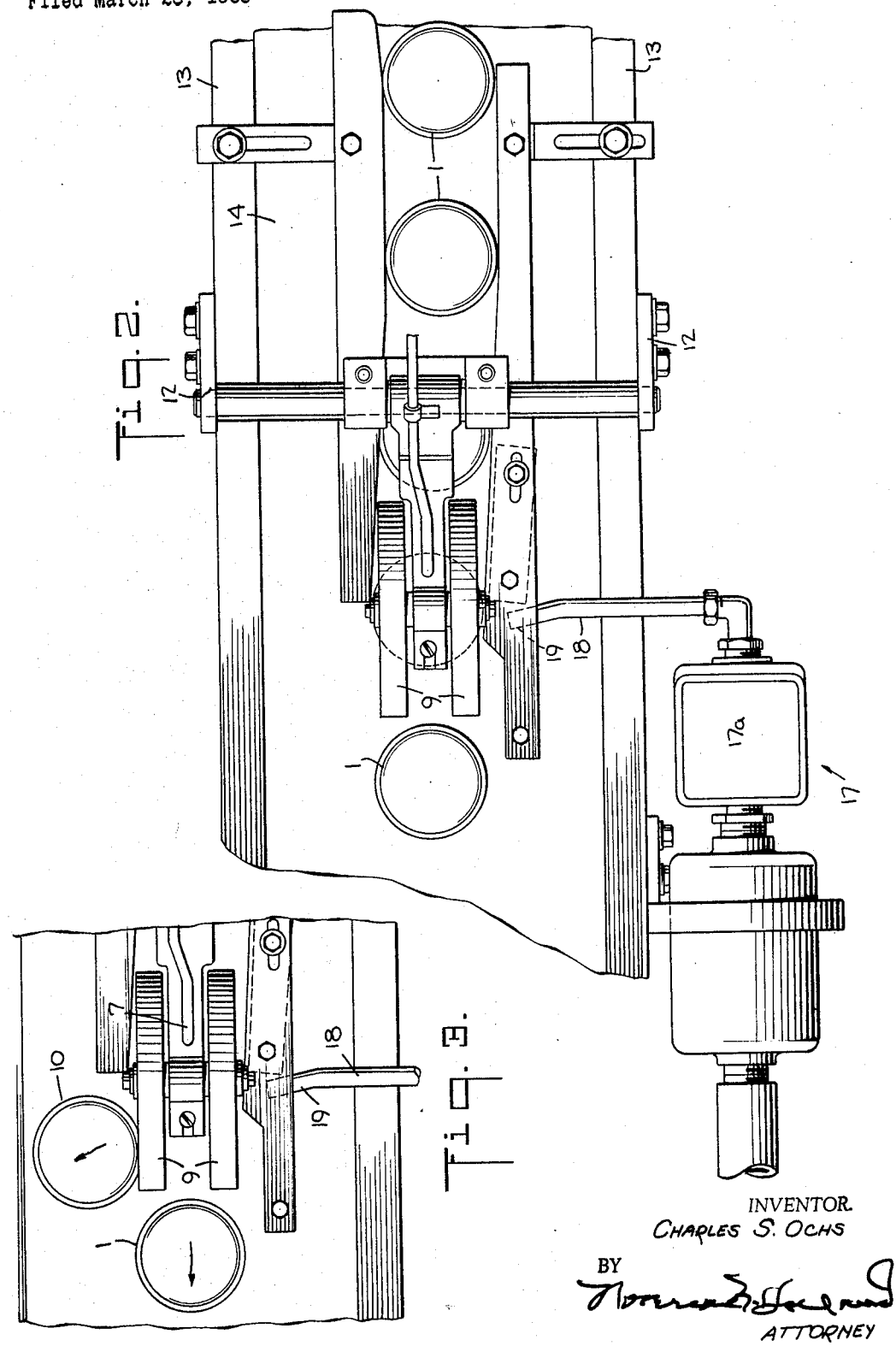

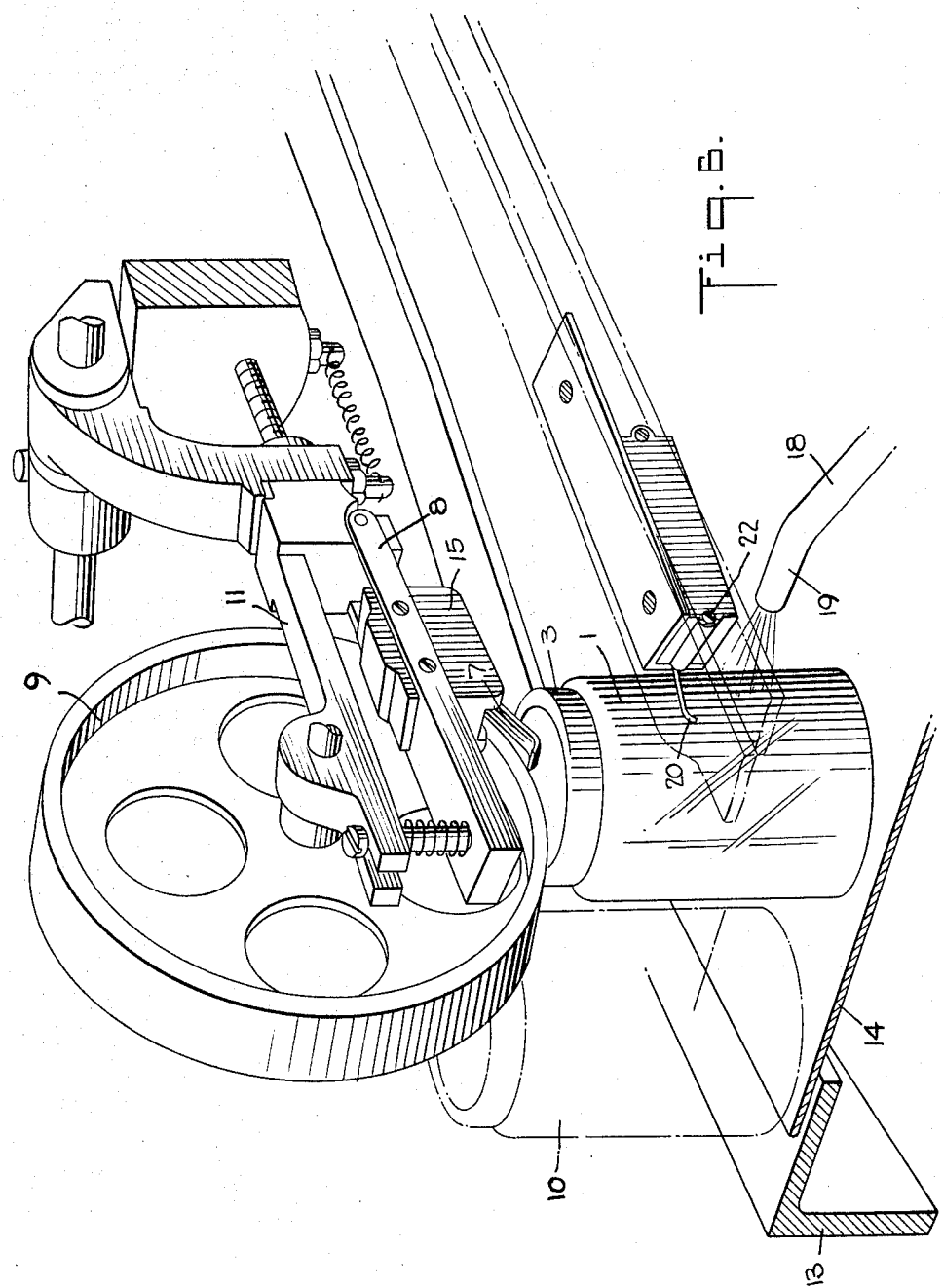

United States Patent Office 3,266,627
Patented August 16, 1966

3,266,627
DETECTING MECHANISM
Charles S. Ochs, Lancaster, Ohio, assignor to Anchor Hocking Glass Corporation, Lancaster, Ohio, a corporation of Delaware
Filed Mar. 28, 1963, Ser. No. 268,703
1 Claim. (Cl. 209—90)

The present invention relates to a mechanism for detecting the presence or absence of a proper vacuum in a sealed package and more particularly to a mechanism for rejecting sealed packages which have insufficient vacuum.

As is well known, there has been an increased use of products which are packaged in a vacuum. Such packages comprise a container and a closure cap mounted thereon. The closure cap has a resilient cover portion or flip panel adapted to flex downwardly when a vacuum is present in the container and to bulge upwardly when there is no vacuum. With this type of closure cap the consumer may readily ascertain whether or not a container has a vacuum by visual inspection of the cover portion of the cap.

Further, such a "flip-panel" permits improperly sealed containers to be detected by suitable detecting mechanisms before the packages reach the consumer.

Heretofore several such detecting mechanisms have been used. Generally they comprise means for moving the sealed package beneath a sensing device, such as a feeler finger or some other suitable sensing device. If the flip panel of the closure cap is down so as to indicate that the package is properly sealed, the rejection mechanism is not actuated. However, if the flip panel is up, such as it would be in a defective package with insufficient vacuum, the sensing mechanism actuates the rejection mechanism which moves the container out of line.

While such detecting mechanisms have been adequate for low speed operations, it has been found that they are ineffective in high speed operations since the rejecting signal is of such short duration that the rejecting mechanism will not receive the signal for a sufficient length of time to properly reject the container.

One object of the present invention is to provide a detecting mechanism capable of high speed uninterrupted operation.

Another object of the present invention is to provide an improved detection mechanism for testing sealed packages to determine whether or not a vacuum is present therein.

Another object of the present invention is to provide a mechanism for testing sealed packages to determine the presence of a vacuum that is adaptable with existing mechanisms.

Another object of the present invention is to provide a mechanism that is simple and economical to operate.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view of the vacuum detecting mechanism of the present invention;

FIG. 2 is a top plan view of the vacuum detecting mechanism shown in FIG. 1;

FIG. 3 is a top plan view of the detecting mechanism showing the rejection of a faulty package;

FIG. 5 is an enlarged view of the package in the process of being detected for proper vacuum;

FIG. 6 is an enlarged perspective view, partly in section with one wheel removed for clarity, showing the detection of a faulty package and its rejection.

Figure 4:
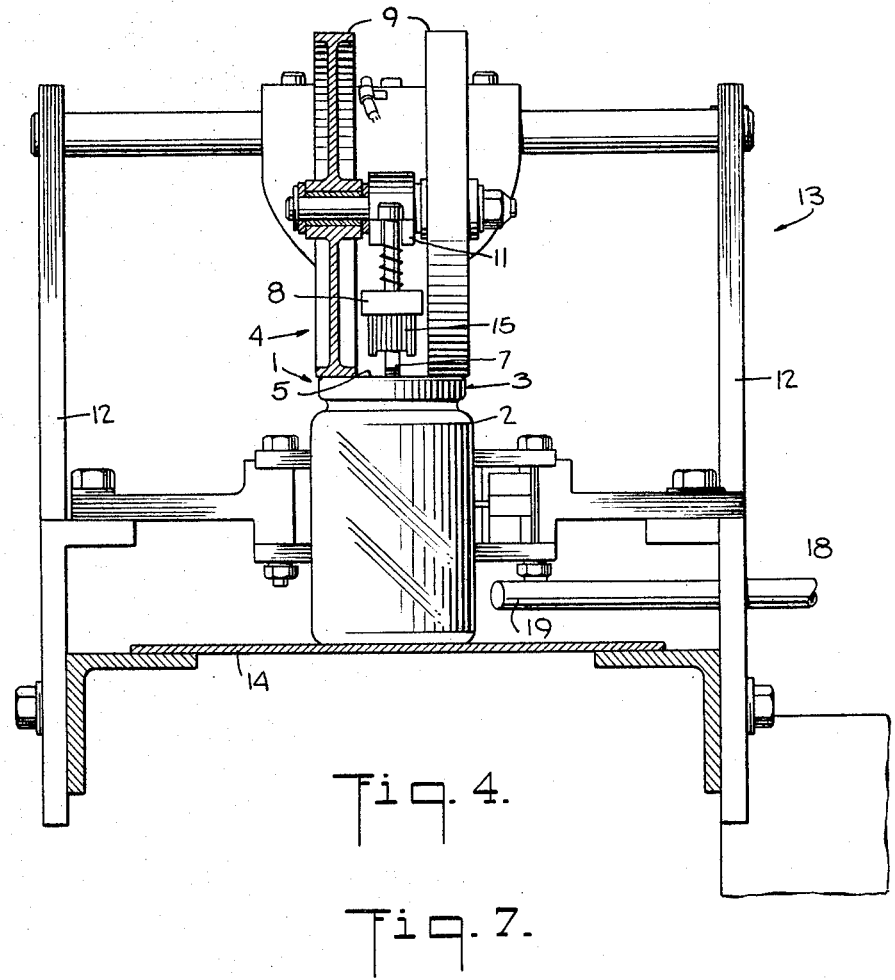
FIG. 4 is a front view, partly in section, of the detecting mechanism.

Referring more particularly to FIGS. 1 and 5 of the drawings, a vacuum sealed package 1, comprising a container 2 and a closure cap 3, is positioned below a detecting unit, generally identified by the reference character 4.

The closure cap 3 (FIG. 5) comprises the usual skirt portion 6 and cover portion 5. The cover portion 5 is flexible so as to act as a flip panel and is adapted to flex from an upwardly bulged position (shown in broken line) indicating an improperly sealed package to a downwardly generally concave position (shown in full lines) indicating a properly sealed package.

The sealed packages 1 are moved below the detecting mechanism 4 which comprises a feeler finger 7 adapted to overlie the flip panel 5 so that it will sense whether the panel 5 is up or down. If the sealed package is not defective the flip panel 5 is down and the package will be moved to the usual packing mechanism. On the other hand, if the sealed package is defective the flip panel 5 is up and the feeler finger 7 will be moved to close an electric circuit which actuates a reject mechanism to move the defectively sealed package (such as package 10 in FIGS. 3 and 6) out of line.

As shown in FIGS. 1, 4 and 6 the feeler finger 7 is mounted on a pivoted arm 8 between a pair of reference wheels 9 mounted on main arm 11 which is journaled in a pair of standards 12 mounted on a frame 13.

The sealed packages 1 are moved beneath the feeler finger 7 by a moving conveyor 14. The wheels 9 on each side of the feeler finger 7 act as a reference plane for the feeler finger 7. The wheels contact opposed peripheral edges of the cover portion 5 of the closure cap 3 thereby giving the feeler finger 7 the proper reference level.

The feeler finger 7 is adapted to close the switch contacts (not shown) in the contact enclosure 15 when the flip panel 5 is bulged upwardly.

In order to insure that the rejection mechanism operates only when a package is at the detecting station beneath feeler finger 7, a side feeler finger 20, which controls another set of contacts (not shown), is mounted along the side of the conveyor 14. This side feeler finger 20 is in series with the top feeler finger 7 and is adapted to close the second set of contacts when a package is in proper position below the top feeler finger 7. Since the side feeler finger 20 is operative only when the widest part of the side walls of the sealed package 1 are beneath the detecting finger 7, the deflection of the top feeler finger 7 by the upper corner of the cap 3 will not act to actuate the rejection mechanism.

The rejection mechanism comprises a compressed air assembly 17 including a solenoid controlled valve 17a from which an air tube 18 extends. The air tube 18 has a nozzle 19 at its end bent at an angle so that the compressed air is ejected in front of the feeler finger 7. Thus when a defective package 10 (FIGS. 3 and 6) is sensed by the feeler finger 7, the compressed air assembly 17 is actuated to eject air from the nozzle 19 against the package 10 to move the defective package 10 out of line.

Figure 7:
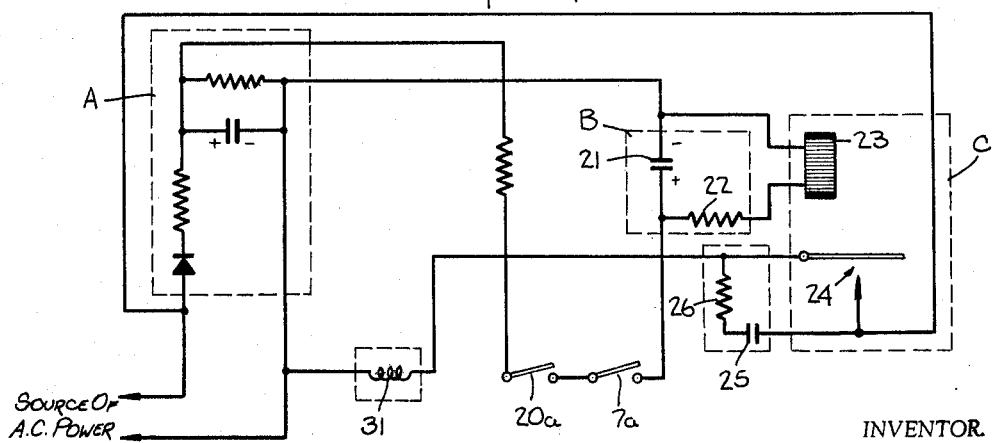
FIG. 7 is a schematic diagram of the electric circuit employed with the detection mechanism to actuate the rejection mechanism.

The electrical circuit of the present invention is shown in FIG. 7 and comprises two normally open switch contacts 7a and 20a which may be the contacts of feeler fingers 7 and 20 and which are connected in series with each other and a signal lengthening circuit B. Contacts 7a and 20a and circuit B are connected to a source of power provided by a rectifying unit A which may be of conventional construction and which is adapted to be coupled to a source of A.C. power.

The signal lengthening unit B comprises a capacitor 21 which is charged by the reject signal upon the closing of the two feeler finger contacts 7a and 20a. The reject signal energizes the relay coil 23 of a control relay C, which in the preferred embodiment shown in the drawing is a mercury wetted control relay to close the contacts 24 thereof as the capacitor 21 discharges through resistor 22 and coil 23. The contact 24 is protected by the usual capacitor 25 and resistance 26 connected thereacross. The closing of contact 24 connects the air valve solenoid coil of the air valve 17a to the A.C. voltage source to open the valve and to reject the defective package.

The reject signal from the feeler fingers 7 and 20 is necessarily short because of the high speed at which the packages move past the feeler fingers 7 and 20. Hence, ordinarily, the signal would not be of sufficient duration to keep coil 31 of the air valve 17a energized long enough to operate properly. However, with the above described circuit the signal charges the capacitor 21 which thereafter discharges slowly through the resistance 22 and the coil 23 to lengthen the duration of the signal.

Thus the coil 31 stays energized for a longer period than the closed period for sensing feeler fingers 7 and 20 to permit the compressed air assembly 17 to operate properly to reject a container. The cycle is set for completion in less time than it takes for the next package to come into contact with the sensing fingers 7 and 20 so that even though the packages are close together two or more faulty packages in succession may be rejected.

The operation will be obvious from the above description. The packages 1 are moved beneath the top feeler finger 7 and the sides thereof also brush against the side feeler finger 20. If the package has a proper vacuum, the flip panel 5 is down and the compressed air mechanism 17 is not energized. However, if the packages have insufficient vacuum, the feeler finger 7 is closed to pulse a short signal through the circuit. The short signal charges the capacitor 21 which thereafter discharges through the resistance 22 and the coil 23 of the relay C to hold contact 24 closed for a longer period than the initial signal. The energization of the coil 23 closes the contact 24 so that the coil 31 of the rejection air valve 17a is energized to open the valve and to blow the defective package out of line. This maintains the control coil 31 of the air valve 17a energized for sufficient time to permit compressed air to be ejected from the nozzle 19 of the air tube 18 to move the defective package 10 out of line.

It will thus be seen that with this structure an improved low vacuum detection mechanism is provided which is capable of high speed operation without interrupted operation and which is simple and economical to operate.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

A sealed package detecting mechanism comprising an electric circuit including a first feeler finger, a second feeler finger in circuit with the first feeler finger adapted to sense the side of a package, a rejection mechanism comprising an air tube adjacent said feeler fingers, means for moving a sealed package beneath said first feeler finger to be sensed thereby, said first feeler finger being operable by a defectively sealed package to send a rejecting signal through said circuit to energize said rejection mechanism and cause air to be ejected therefrom, a capacitor for storing said signal, a resistance through which the signal in said capaictor is discharged and a relay to transfer the signal from said resistance to said rejection mechanism to actuate the rejection mechanism whereby said signal is lengthened to permit proper functioning of the rejection mechanism by causing the air tube to eject air therefrom for a time interval greater than the time of the initial rejecting signal, said air tube being adjacent the path of the sealed package and having a nozzle angled to have a component in the direction of movement of said sealed packages and operable for ejecting air from said tube against defectively sealed packages to move them out of line after said package has moved past said feeler fingers.

References Cited by the Examiner

UNITED STATES PATENTS

| | | | |
|---|---|---|---|
| 2,101,166 | 12/1937 | Crago | 317—141 |
| 2,339,638 | 1/1944 | Hanszey et al. | 73—52 X |
| 2,689,647 | 9/1954 | Hofstetter | 209—90 |
| 3,089,593 | 5/1963 | Honnert | 73—52 X |

ROBERT B. REEVES, *Primary Examiner.*

DAVID SCHONBERG, *Examiner.*

J. SMITH, *Assistant Examiner.*